United States Patent [19]

Murphy et al.

[11] Patent Number: 5,400,259
[45] Date of Patent: Mar. 21, 1995

[54] WORK CLAMP PROTECTION SYSTEM AND A METHOD FOR USE

[75] Inventors: William P. Murphy, Lockport; Donald E. Kress, Clarence, both of N.Y.

[73] Assignee: Strippit, Inc., A Unit of IDEX, Akron, N.Y.

[21] Appl. No.: 132,800

[22] Filed: Oct. 7, 1993

[51] Int. Cl.⁶ .............................................. G05B 23/02
[52] U.S. Cl. ..................................... 364/474.2; 83/62; 83/76.7; 364/474.17
[58] Field of Search ........... 364/474.2, 474.02, 474.17, 364/474.19, 474.21, 184–187, 167.01; 83/76.7, 72, 74, 58, 62

[56] References Cited

U.S. PATENT DOCUMENTS

| | | | |
|---|---|---|---|
| 4,471,676 | 9/1984 | Mason | 364/474.2 X |
| 4,651,601 | 3/1987 | Sasaki | 364/474.2 X |
| 4,758,961 | 7/1988 | Uemura et al. | 364/474.2 X |
| 5,199,338 | 4/1993 | Schorn | 364/474.2 X |
| 5,285,373 | 2/1994 | Watanabe et al. | 364/474.09 X |

*Primary Examiner*—Joseph Ruggiero
*Attorney, Agent, or Firm*—Hill, Steadman & Simpson

[57] ABSTRACT

A system is provided for identifying no-punch zones corresponding to positions of work clamps on a carriage holding a workpiece to be positioned for tools of a punch press. The system provides a method for storing geometric information with respect to the clamp as well as specifications for the tools on a holder, such as a turret, of the punch press. The edge of each of the clamps is sensed and stored in a control unit which can, therefore, determine boundaries of each of the clamps based on the stored geometric configuration information of the clamp. No-punch zones of the clamps may be determined based on the geometry of the particular tool of the turret and the geometry and the positions of the clamps. As a result, the punch press may be inhibited from operating within the no-punch zones or, in the alternative, the clamp or clamps may be repositioned from the no-punch zone of the clamp for subsequent operation of the punch press. A default setting is further provided for positioning the clamp in a default position upon activation of a flag indicating an occurrence of an event which may effect the no-punch zones.

18 Claims, 2 Drawing Sheets

WORK CLAMP PROTECTION SYSTEM AND A METHOD FOR USE

BACKGROUND OF THE INVENTION

The present invention generally relates to punch presses. More specifically, the present invention relates to a punch press having a positioning system for shifting of one or more clamps and/or a workpiece being held by the clamps in the x-axis and/or the y-axis.

In punch presses, work clamps which hold workpieces in a particular location are typically shifted in both the x-direction and the y-direction so as to position the workpiece in a particular location to enable punching or the like thereof. The positioning of the workpieces and the tools for punching the same may take place manually or automatically, such as by computer control.

A standard type of computer controlled automatic punch press is known, such as a computer-controlled turret press. Such a press is equipped with a vertically moving ram centered at a work station. A pair of spaced-apart rotatable turrets are provided with a plurality of circumferentially spaced tool holding sections. The upper turret carries a plurality of different punches, and the lower turret carries a plurality of corresponding dies shaped to mate with the punches. The turrets rotate in unison presenting a selected pair of a punch and a die to the work station. The workpiece is insertable into the space between the turrets such that, upon activation of the ram, a selected punch at the work station can be forced through the workpiece and into the die.

Movement control of the workpiece is typically performed by a coordinate movement mechanism associated with a workpiece supporting table. Standard movement systems include a carriage assembly moveable towards and away from the work station. The carriage assembly is typically equipped with two or more clamps which moves in unison transverse to the direction of the work station.

In modern punch presses, each of the clamps may be independently repositionable along the length of the carriage so as to accommodate different size workpieces. More recently, automatic repositioning of workpiece clamps has been provided wherein each of the clamps can be disengaged from its fixed position on the carriage and automatically moved to a different position, all under the control of a central processor unit.

In order to provide maximum exposure of the workpiece to the work station, such clamps are generally constructed as "pass-through" clamps having a vertical height which is less than the spacing between the turrets. Because of this, it is possible for the clamp, or the tip of the clamp, to be positioned at the work station where activation of the ram would cause serious damage to the clamp, the punch or the machine itself.

To prevent this, work clamps are commonly provided with projecting wire guards which can signal the controller when the clamp is in a danger zone thereby inhibiting operation of the ram. Such projecting guards, however, prevent the clamp from positioning the portion of the workpiece immediately adjacent the clamp to the work station and thereby reduce the area of the workpiece that can be acted upon by the punch without repositioning of the work clamp. Furthermore, the wire guards may reduce the speed at which the clamps may move.

While it is also further generally known to program the position of the work clamp into the movement control system such that the control system "knows" where the clamp is, a large safety margin must be provided in the control system since the accuracy of the knowledge of the positioning of the work clamp may not be precise and further since the geometry of the tool, i.e., the punch, changes. Commonly used punches may vary from a small diameter punch on the order of, for example, one-eighth of an inch to very large punches or notching units which may, for example, be as large as four or six inches in diameter.

Therefore, in order to provide a safe no-punch zone, i.e. that position of the workpiece movement device in which punching will not be permitted in order to protect the clamp, it is necessary to know the exact position of the clamp along the length of the carriage, the exact position of the carriage with respect to the work station, the calculated position of the clamp with respect to the work station calculated from the location of the clamp along the carriage and the position of the carriage, the geometry of the clamp and the geometry of the tool. In addition, a safety factor may be desired corresponding to an additional error factor which may exist in the carriage control and the possible off-centering of the punch with respect to the work station.

When all these factors are known and calculated, a minimal no-punch zone can be determined. Once, however, a determination has been made, it must be recognized that since the clamps are repositionable, the determination of clamp position must be re-input to the controller both upon the initiation of each reactivation of the machine and upon the occurrence of any automated or manual movement of the clamps.

Therefore, a need exists for an improved system for determining the position of the clamps in relation to the tools included in a tool holder, such as a turret, for example, of a punch press.

SUMMARY OF THE INVENTION

According to the invention, a method is provided for identifying no-punch zones corresponding to positions of a plurality of work clamps on a carriage. A workpiece is held by the clamps and is positioned for a punch press. A turret-type punch press having various tools, such as dies, punches and the like, may be implemented.

In an embodiment, the method comprises storing geometric configuration information relating to each of the plurality of clamps; storing specifications for each of the plurality of tools of the turret wherein the specifications may include position, i.e. placement in the tool queue or turret and size and/or orientation information with respect to the tools associated with the turret; sensing a portion of one of the plurality of clamps; storing coordinates associated with the sensed clamp; determining boundaries of the clamp based on the sensed portion of the clamp and the stored geometric configuration information of the clamp; repeating the portion sensing, coordinate storing and boundary determining steps for each of the plurality of clamps; and determining the no-punch zones of the clamps based on the stored information of at least one of the tools in relation to the determined boundaries of the clamps; and determining if a clamp movement would place the no-punch zone of the clamp in a position where the clamp may be impinged by one of the plurality of tools.

In an embodiment, the method further comprises the step of inhibiting operation of the punch press when one of the plurality of clamps is positioned so that its no-punch zones impinge upon the tool.

In another embodiment, the method comprises the step of repositioning the clamp and its implied no-punch zone to a safe position before a punching operation of the punch press.

In a still further embodiment, the method comprises the step of establishing position information for use as a default setting.

According to the invention, a system is further provided for identifying no-punch zones for a punch press holding a workpiece. In an embodiment, the system comprises a tool holder including a plurality of tools wherein each of the plurality of tools of the tool holder is constructed and arranged for contacting the workpiece. A carriage is provided, and a plurality of clamps hold the workpiece and is capable of movement along the carriage wherein the clamps each include a vane. A sensor determines the position of at least an edge of each of the plurality of clamps. A control means stores information with respect to geometric configurations of each of the clamps and specifications for each tool of the tool holder wherein the control unit determines boundaries of the no-punch zones of the clamps from the sensed positions, the stored information and the specifications.

In an embodiment, the control means of the system inhibits operation of the punch press in one of the no-punch zones.

In another embodiment, the control means of the system may initiate repositioning of at least one of the plurality of clamps.

According to the invention, a method is further provided for controlling operation of a punch press including a plurality of tools for machining a workpiece held by a plurality of clamps by identifying zones of the clamps for altering of operation.

In an embodiment, the method comprises the steps of sensing position information of at least a portion of each of the plurality of clamps; providing a signal indicative of the sensed position information; storing information relating to the plurality of tools, geometric data of the plurality of clamps, and the sensed position information; and determining the zones of the clamps for altering the operation of the punch press based on the stored information.

In an embodiment, the method comprises the step of inhibiting operation of the punch press upon detection of the position of the clamps of the punch press and its associated no-punch zone whereby the clamp may be impinged by a tool.

In another embodiment, the method comprises repositioning at least one of the plurality of the clamps of the punch press to a safe position.

It is, therefore, an advantage of the present invention to provide a system and a method for identifying no-punch zones of clamps for use with a punch press.

Moreover, an advantage of the present invention is to provide a system and a method for preventing operation of the punch press in a no-punch zone of a clamp.

A further advantage of the present invention is to provide a system and a method for repositioning one or more of the work clamps when one or more of the work clamps is within its no-punch zone or near its no-punch zone.

A still further advantage of the present invention is to provide a system and a method for shortening cycle time for machining of a workpiece on a turret-type punch press.

Yet another advantage of the present invention is to provide a system and a method for increasing production of workpieces on a turret-type punch press.

Additional features and advantages of the present invention are described in and will be apparent from the detailed description of the presently preferred embodiments and from the drawings.

DETAILED DESCRIPTION OF THE PRESENTLY PREFERRED EMBODIMENTS

Figure 1:
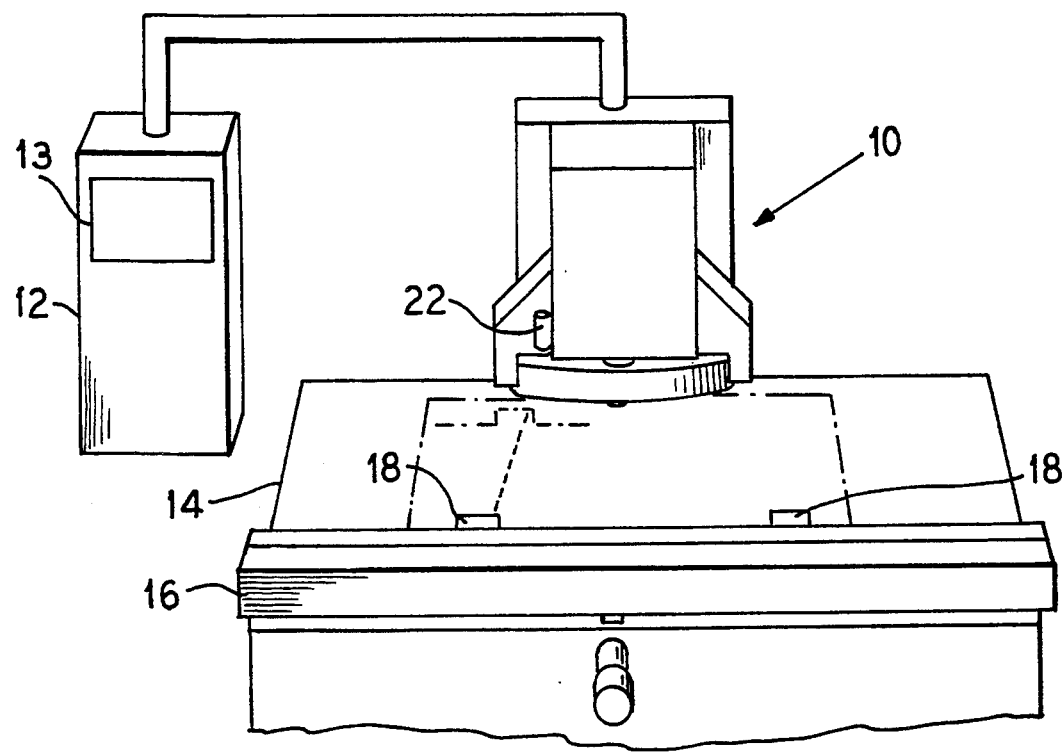
FIG. 1 illustrates a perspective view of a turret-type punch press having a positioning system in accordance with an embodiment of the present invention.

The present invention generally relates to a system and a method for determining geometric configuration of no-punch zones of at least one clamp holding a workpiece and determining orientation and position of a particular tool of a tool holder with respect to the clamp and the workpiece for a punch press. In general, the invention provides a system having a control unit with a memory for storing geometric information for each of the specific clamps employed, as well as geometric information for other clamps which may be employed. In addition, the memory stores size information for each tool or tool holder, as well as location of each tool on a tool holder, such as a turret.

When a tool is positioned in a work station, geometry of the selected tool can be compared to geometry of the work clamp to establish a minimum set-off position for a calculated centerline of the clamp and carriage with respect to the work station. The system is further provided with a clamp position detector or sensor to determine position of the clamp along the carriage. The position data is sent to a control unit to compute position of the centerline of the clamp along the length of the carriage. The position of each of the clamps is, therefore, known by the system and stored in its memory.

The present invention utilizes a Fanuc Model OP-C Computer Numerical Control (CNC). The CNC incorporates a Programmable Machine Controller (PMC). Three macro programs are implemented for: 1) determining the number of work clamps installed on the machine and the physical location of each work clamp (Macro Program 09028); 2) sending to the CNC the dimensional information required to form no-punch zones of each clamp based on the geometry and position of the clamp and the geometry of the selected tool (Macro Program 09329); and 3) determining what tool has been selected and what is the geometry of that tool (Macro Program 09330).

Macro Program 09028 is called by a machine user's program through the use of the Fanuc CNC when determining of the locations or of the positions of the work clamps is desired. The code of the Macro Program 09028 is as follows:

```
09028
M98P9551
IF[R753.3EQO]GOT090
#10011=0
#10033=8
#511=0
#512=0
#513=0
#514=0
#116=#4014
#118=#4109
#121=#4001
#124=#4003
G91G00G54
G70X[[-39.*#115]-#5021]Y[[-37.79*#115]-#5022]
G01
#10032=0
WHILE[#10032LT4]DO1
WHILE[X2.3EQO]DO2
IF[#5021GT[6*#115]]GOT020
X[.250*#115]F[750.*#114]
END2
WHILE[X2.3EQ1]DO2
X[-.125*#115]F[750.*#114]
END2
WHILE[X2.3EQO]DO2
X[.010*#115]F[3000.*#114]
END2
WHILE[X2.3EQ1]DO2
X[-.005*#115]F[3000.*#114]
END2
WHILE[X2.3EQO]DO2
X[.001*#115]F[3000.*#114]
END2
#10032=#10032+1
G09
#[510+#10032]=#5021
WHILE[X2.3EQ1]DO2
X[.375*#115]F[750.*#114]
IF[#5021GT[6*#115]]GOT020
END2
END1
N20G00
(CLASS 1)
#10111=[[#511/#115]+#10034+3.4685]*2540
#10112=[[#511/#115]+#10034-3.4685]*2540
10113=-36.0315*2540
#10211=[[#512/#115]+#10034+3.4685]*2540
#10212=[[#512/#115]+#10034-3.4685]*2540
#10213=-36.0315*2540
#10311=[[#513/#115]+#10034+3.4685]*2540
#10312=[[#513/#115]+#10034-3.4685]*2540
#10313=-36.03515*2540
#10411=[[#514/#115]+#10034+3.4685]*2540
#10412=[[#514/#115]+#10034-3.46851]*2540
#10413=-36.03515*2540
(CLASS 2)
#10121=[[#511/#115]+#10034+1.9375]*2540
#10122=[[#511/#115]+#10034-1.9375]*2540
#10123=-37.5625*2540
#10221=[[#512/#115]+#10034+1.9375]*2540
#10222=[[#512/#115]+#10034-1.9375]*2540
#10223=-37.5625*2540
#10321=[[#513/#115]+#10034+1.9375]*2540
#10322=[[#513/#115]+#10034-1.9375]*2540
#10323=-37.5625*2540
#10421=[[#514/#115]+#10034+1.9375]*2540
#10422=[[#514/#115]+#10034-1.9375]*2540
#10423=-37.5625*2540
IF[D600.ONE1]GOT040
(CLASS 3)
#10131=[[#511/#1151+#10034+2.75]2540
#10132=[[#511/#115]+#10034-2.75]*2540
#10133=-2.25*2540
#10231=[[#512/#115]+#10034+2.75]*2540
#10232=[[#512/#115]+#10034-2.75]*2540
#10233=-2.25*2540
#10331=[[#513/#115]+#10034+2.75]*2540
#10332=[[#513/#115]+#10034-2.75]*2540
#10333=-2.25*2540
#10431=[[#514/#115]+#10034+2.75]*2540
#10432=[[#514/#115]+#10034-2.75]*2540
#10433=-2.25*2540
(CLASS 4)
#10141=[[#511/#115]+#10034+1.5095]*2540
#10142=[[#511/#115]+#10034-1.5095]*2540
#10143=-1.0095*2540
#10241=[[#512/#115]+#10034+1.5095]*2540
#10242=[[#512/#115]+#10034-1.5095]*2540
#10243=-1.0095*2540
#10341=[[#513/#115]+#10034+1.5095]*2540
#10342=[[#513/#115]+#10034-1.5095]*2540
#10343=-1.0095*2540
#10441=[[#514/#115]+#10034+1.5095]*2540
#10442=[[#514/#1151+#10034-1.5095]*2540
#10443=-1.0095*2540
GOT040
(CLASS 5)
#10151=[[#511/#115]+#10034+2.8125]*2540
#10152=[[#511/#115]+#10034-2.8125]*2540
#10153=-36.7*2540
#10251=[[#512/#115]+#10034+2.8125]*2540
#10252=[[#512/#1151+#10034-2.8125]*2540
#10253=-36.7*2540
#10351=[[#513/#1151+#10034+2.8125]*2540
#10352=[[#513/#1151+#10034-2.8125]*2540
#10353=-36.7*2540
#10451=[[#514/#1151+#10034+2.8125]*2540
#10452=[[#514/#1151+#10034-2.8125]*2540
#10453=-36.7*2540
(CLASS 6)
#10161=[[#511/#1151+#10034+3.8125]*2540
#10162=[[#511/#1151+#10034-3.8125]*2540
#10163=-35.7*2540
#10261=[[#512/#1151+#10034+3.8125]*2540
#10262=[[#512/#1151+#10034-3.8125]*2540
#10263=-35.7*2540
#10361=[[#513/#115]+#10034 +3.8125]*2540
#10362=[[#513/#115]+#10034-3.8125]*2540
#10363=-35.7*2540
#10461=[[#514/#1151+#10034+3.8125]*2540
#10462=[[#514/#115]+10034-3.8125]*2540
#10463=-35.7*2540
(CLASS 7)
#10171=[[#511/#1151+#10034+2.8125]*2540
#10172=[[#511/#115]+#10034-2.8125]*2540
#10173=-36.7*2540
#10271=[[#512/#115]+#10034+2.8125]*2540
#10272=[[#512/#1151+#10034-2.8125]*2540
#10273=-36.7*2540
#10371=[[#513/#115]+#10034+2.8125]*2540
#10372=[[#513/#115]+#10034-2.8125]*2540
#10373=-36.7*2540
#10471=[[#514/#1151+#10034+2.8125]*2540
#10472=[[#514/#115]+#10034-2.8125]*2540
#10473=-36.7*2540
(CLASS 8)
N40#10181=11*2540
#10182=-39.*2540
#10183=-35.5*2540
#10281=0
#10282=0
#10283=0
#10381=0
#10382=0
#10383=0
#10481=0
#10482=0
#10483=0
#10035=0
#10038=0
WHILE[4GT#10035]DO1
#10035=#10035+1
N#0
G10L50P[4470+#10038]R#[[10001]+[#10035*100]+[#10033*10]]
G10L50P[4471+#10038]R#[[10002]+[#10035*100]+[#10033*10]]
G10L50P[4472+#10038]R#[[10003]+[#10035*100]+[#10033*10]]
#10038=#10038+3
END1
#1107=1
G#116
F#118
```

```
G#121
G#124
#3001=0
WHILE[R753.3NEO]DO1
IF[#3001GT5000]GOT099
END1
#1107=0
N9OM98P9552
M99
N98#10032=1
#1132=0
#3000=28(CLAMP SEARCH ERROR)
M99
N99#1132=0
#3000=28(LADDER COMM. ERROR)
M99
%
```

Macro Program 09329 is called each time a tool is selected after Macro Program 09330 has considered which tool is being selected and has set the tool classification record designator. The no-punch zones dimensional information which is necessary is sent to the Fanuc CNC parameters.

The code of the Macro Program 09329 is as follows:

```
09329
IF[#10033EQ#10011]G*OT020
IF[#10033NE8]GOT05
#10032=4
N5#10035=0
#10038=0
WHILE[#10032GT#10035]DO1
#10035=#10035+1
N#O
G1OL50P[4470+#10038]R#[[10001]+[#10035*1001+
 [#10033*10]]
G1OL50P[4471+#10038]R#[[10002]+[#10035*1001+
 [#10033*10]]
G1OL50P[4472+#10038]R#[[10003]+[#10035*100]+[#10033*-
 10]]
#10038=#10038+3
END1
#10011=#10033
N2OM99
%
```

Macro Program 09330 is called each time a tool is selected, and the macro associates a tool classification record with the selected tool. The code of the Macro Program 09330 is as follows:

```
09330
#10033=8
IF[#20GT20]GOT0999
IF[#20LT1]GOT0999
IF[R753.3EQ1]GOT0800
IF[D600.IEQ1]GOT0200
IF[D600.OEQI]GOT0300
(STRIPPIT STYLE TURRET)
GOTO[100+#20]
N101#10033=1
GOT0800
N102#10033=2
GOT0800
N103#10033=2
GOT0800
N104#10033=2
GOT0800
N105#10033=2
GOT0800
N106#10033=1
GOT0800
N107#10033=2
GOT0800
N108#10033=2
GOT0800
N109#10033=2
GOT0800
N110#10033=2
GOT0800
N111#10033=1
GOT0800
N112#10033=2
GOT0800
N113#10033=2
GOT0800
N114#10033=2
GOT0800
N115#10033=2
GOT0800
N116#10033=1
GOT0800
N117#10033=2
GOT0800
N118#10033=2
GOT0800
N119#10033=2
GOT0800
N120#10033=2
GOT0800
(S STYLE LONG TOOLING)
N20OGOTO[200+#20]
N201#10033=1
GOT0800
N202#10033=2
GOT0800
N203#10033=2
GOT0800
N204#10033=2
GOT0800
N205#10033=2
GOT0800
N206#10033=1
GOT0800
N207#10033=2
GOT0800
N208#10033=2
GOT0800
N209#10033=2
GOT0800
N210#10033=2
GOT0800
N211#10033=1
GOT0800
N212#10033=2
GOT0800
N213#10033=2
GOT0800
N214#10033=2
GOT0800
N215#10033=2
GOT0800
N216#10033=1
GOT0800
N217#10033=2
GOT0800
N218#10033=2
GOT0800
N219#10033=2
GOT0800
N220#10033=2
GOT0800
(A STYLE LONG TOOLING)
N30OGOTO[300+#20]
N301#10033=1
GOT0800
N302#10033=4
GOT0800
N303#10033=2
GOT0800
N304#10033=2
GOT0800
N305#10033=2
GOT0800
N306#10033=1
```

-continued

```
GOT0800
N307#10033=4
GOT0800
N308#10033=4
GOT0800
N309#10033=3
GOT0800
N310#10033=4
GOT0800
N311#10033=1
GOT0800
N312#10033=4
GOT0800
N313#10033=2
GOT0800
N314#10033=2
GOT0800
N315#10033=2
GOT0800
N316#10033=1
GOT0800
N317#10033=4
GOT0800
N318#10033=4
GOT0800
N319#10033=3
GOT0800
N320#10033=4
N80OM99
N999#3000=30(TURRET OUT OF RANGE)
M99
%
```

A number of other macro programs are implemented into the Fanuc CNC control to accomplish various standard machine functions as is known. The unique method and system, however, of utilizing the above macro programs to create and to identify unique no-punch zones of the work clamps for each specific type of tool that is selected during movement of the turret will now be described hereinafter with reference to the drawings.

As illustrated in FIG. 1, a punch press 10 is generally shown having a programmable control unit 12. The punch press 10 may be positioned about a workpiece 14 for enabling punching of the workpiece 14. The workpiece 14 may be positioned by a carriage 16 in the x-direction and/or the y-direction with the assistance of clamps 18 which move transverse to the direction of the carriage 16.

Each clamp 18 includes a vane 20 in the form of a Hall effect switch. The vane 20 is fixed on the clamp 18 in a predetermined x-y coordinate position. A sensor 22 is fixed to the punch press 10 in a known position. The vane 20 and the sensor 22 operate in conjunction to determine the position of each clamp 18 which will be described hereinafter and which has been previously set forth with respect to Macro Program 09028.

An actuator 21 is further illustrated which controls movement of the clamp 18 along the carriage 16. While only the two clamps 18 are illustrated in FIG. 1, it should be understood that any number of clamps may be implemented for securing and positioning of the workpiece 14.

Figure 2:
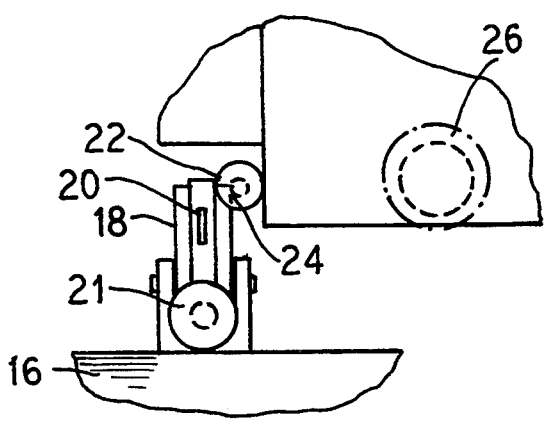
FIG. 2 illustrates a partial fragmentary view of a sensor, clamp, workpiece and a defined no-punch zone with respect to the clamp for the system illustrated in FIG. 1.
Figure 3:
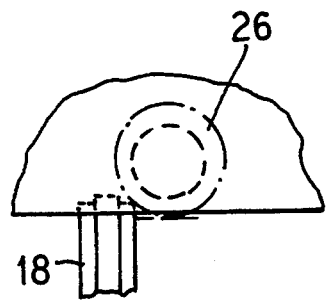
FIG. 3 illustrates a partial fragmentary view of the clamp of FIG. 2 connected to the workpiece and positioned immediately adjacent a no-punch zone of the clamps defined by the system of the present invention.

In operation, the work clamps 18 of the carriage 16 are moved to a desired position in preparation for enabling of punching of the workpiece 14. A first one of the work clamps 18 is passed such that the vane 20 on the clamp 18 passes within a range of the sensor 22 to locate a portion 24 of the first one of the work clamps 18 as shown in FIG. 2. A signal indicative of the portion, such as an edge 24 of the work clamp 18, is sent to the control unit 12 and stored in memory 13 in the form of a coordinate X-Y position.

Geometries of each of the clamps 18 are also stored in the memory 13 of the control unit 12, and therefore, the exact position of each of the clamps 18 in its entirety is known. Subsequent positions for each of the other work clamps 18 operatively connected to the carriage 16 may then be determined in the same manner in which the position of the first clamp was determined, i.e. passing the vanes 20 of the clamps 18 individually by the sensor 22 and transmitting a signal corresponding to the coordinates thereof to the control unit 12.

The control unit 12 may then determine no-punch zones 26 of the clamps 18 based on the tools in use with the punch press 10 and the detected position data of the clamps 18. As previously mentioned, while only two work clamps 18 are illustrated in FIG. 1, any number of work clamps 18 may be used for positioning of the workpiece 14 by the clamps 18 on the carriage 16.

In order to refine the determination of the edge 24 of the work clamp 18 as previously discussed, the vane 20 fixed to the work clamp 18 is moved past the sensor 22 to detect alternating positive movements and negative movements past the sensor 22. These movements become progressively smaller increments and also somewhat slower by position control of the control unit 12 based on the sensed signals from the sensor 22. The fine detection of the work clamp 18 with respect to the sensor 22 may be ascertained to within 0.001 inch increments. After this threshold is reached for each of the clamps 18, the coordinate positions of the clamps 18 are stored in the memory 13.

Subsequently, the control unit 12 in conjunction with the sensor 22 continues searching for work clamps 18 and storing their locations based on their sensed portion and the known geometry of the clamps 18 as previously stored in the memory 13 of the control unit 12. If no additional clamps are detected by the sensor 22, the positions of each of the clamps 18 of the carriage 16 is then known and stored in the control unit 12. A centerline of each of the clamps 18 may also be calculated from the sensed portion of each of the work clamps 18 and further from the stored geometrical configurations of the clamps 18. Based on the centerline, all of the no-punch zones of the clamps 18 may be calculated and stored in the memory 13 of the control unit 12. The no-punch zones of the clamps 18 may then be called by a program of the control unit 12 which controls operation of the punch press 10.

In this regard, a tool classification record associated with each type of tool in the turret of the punch press 10 is stored in the memory 13. For example, a tool classification record for a turret-type press is stored in the memory 13 of the control unit 12. In its simplest form, the only information stored for each tool position is the maximum size of tool which that position may hold. In such a system, the no-punch zone of the clamp 18 will be set for each tool position at the maximum tool size that position can hold. In more refined systems, the tool classification record includes the geometries of each of the tools of the turret as well as position and orientation information of the tools on the turret. Each of the tools may generally be rotated in its position on the turret. Therefore, the no-punch zones of the clamps for each tool varies, not only based on the particular geometry of the tool, but also with the orientation of the tool in the turret. A system and a method for angularly orientating at least one tool of the turret is described in commonly assigned U.S. Pat. No. 4,658,688, the disclosure of which is herein incorporated by reference.

Furthermore, an additional tool classification record may be stored in the memory 13 as a default record. The default record stores an absolute safe zone for punching when, for example, a particular type of tool, tool position, clamp position, or the like, may not be determined.

That is, seven tool classification records may be stored in the memory 13 for seven different types of tools of the turret which may be in the punch press 10. An additional tool classification record is also stored in the memory 13 for a default to an absolute safe zone. The default record provides a flag which indicates that a particular no-punch zone of a clamp is no longer valid for a particular reason, such as unknown tool position, unknown clamp position, or the like. The flag typically may be set when the punch press 10 is initially turned on, for example.

When the punch press 10 is turned on, however, the positions of the clamps 18 are not known, and, therefore, the absolute safe zone must be determined. Other occurrences which activate the flag of the default tool classification record include when the turret or other tool holder and/or the carriage 16 has been bumped, moved, or the like. Similarly, if the clamps 18 have been moved on the carriage 16 manually, for example, the positions of the clamps 18 are no longer valid as stored in the memory 13 of the control unit 12. The default record indicating an absolute safe zone must be called to default to a safe zone.

Although the present invention is described with reference to a turret-type punch press, any other tool positioning device may be implemented, such as a tool holding mechanism in which the tools may be automatically or manually removed therefrom and positioned for performing a particular operation. The tool specifications are stored, and the clamps and their associated no-punch zones may be positioned with respect to the tool to be used by the particular press.

Upon receiving a command from the control unit 12 of the punch press 10 which requires punching of the workpiece 14, a tool classification record designator is set. If a flag is set, however, the tool classification designator is automatically forced to the default record for the absolute safe zone. If the flag is not set, then the tool classification record designator is set to the particular record associated with the particular tool of the punch press 10.

Furthermore, a turret dependent tool classification file is stored in memory 13 of the control unit 12 for each type turret configuration that the punch press 10 can accommodate. Following each turret command, the data in the tool classification record is sent to the control unit 12 to establish the no-punch zones of the clamps 18.

The control unit 12 further determines if the tool classification record being called for machining of the workpiece 14 is the same as the last tool classification record previously used. If it is the same, then no new information is sent.

If the punch press 10 is set to punch the workpiece 14 at a point determined to be a no-punch zone of the clamp 18, the operation of the punch press 10 is stopped for preventing punching. In the alternative, the automatic clamp positioning system may move the clamp 18 along with its implied no-punch zone into a safe position prior to punching while maintaining the workpiece 14 in the position required for punching. At this time, a new position for the clamp 18 along with its implied no-punch zone is set.

Figure 4:
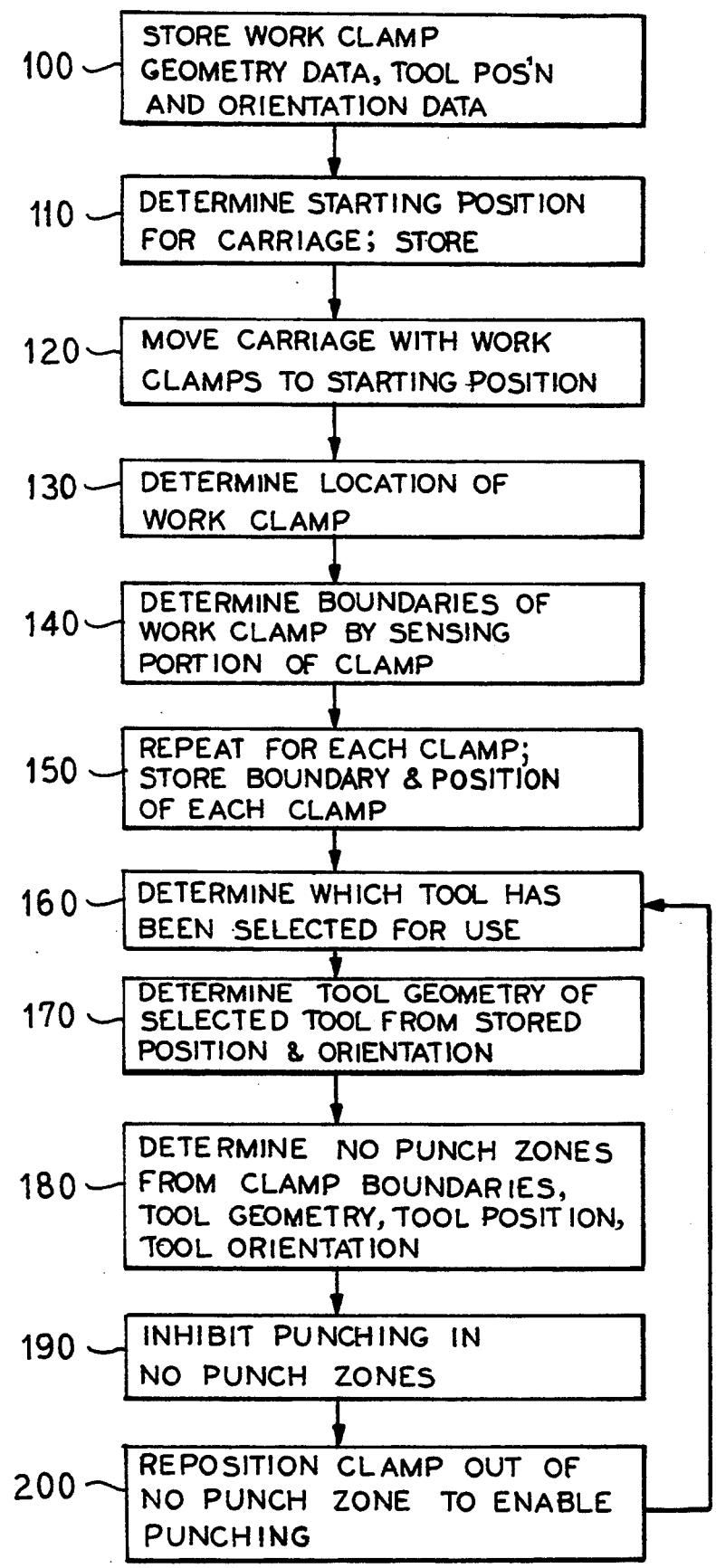
FIG. 4 illustrates a flowchart defining a method of positioning and determining the positions of the clamps for the system of the present invention.

Referring now to FIG. 4, a flowchart is illustrated defining a method of positioning and determining the positions of the clamps 18 for the system of the present invention. Prior to operation, the system stores work clamp geometry data as well as tool position and orientation data as shown at 100. Furthermore, a starting position for the carriage 16 is determined and stored at 110.

At step 120, the system moves the carriage 16 with the work clamps 18 to a known starting position. A first one of the work clamps 18 is passed within a range of the sensor 22 to locate a portion, such as the vane 20 of the clamp 18 at step 130. A signal is provided corresponding to the detected position to the control unit 12 and is converted to coordinate positions of the boundaries of the work clamp 18. The control unit 12 at step 140 determines the boundaries of the clamp 18 by the sensed portion.

Since geometric configuration information of the clamps 18 is stored in the memory 13 of the control unit 12, the control unit 12 may calculate at step 140 the coordinates of the boundaries of the work clamp 18 based on the one detected coordinate of the work clamp 18 by making use of the known geometry of the clamp 18. At step 150, the system 10 repeats the above steps for each of the work clamps 18 on the carriage 16 until all position information for each of the work clamps 18 is provided to the control unit 12.

The control unit 12 stores tool classification records for each of the tools of the turret which the punch press 10 may alternately use. The tool classification records correspond to position and orientation information of the tools on the turret and geometries of the tools, such as punches or the like, which make-up the turret of the punch press 10. A plurality of tools with corresponding tool classification records may be associated with the punch press 10 as well as the default classification record corresponding to an absolute safe zone for moving the clamp position or turret position upon occurrence of an event, such as manual movement of the clamps 18 or the like.

At step 160, the tool selected for use by the punch press is determined. The tool geometry may then be determined from the position and orientation of the selected tool at step 170 for the particular application of the tool.

From the tool geometry (based on the tool position and orientation) and the sensed portions of the clamps 18, and thereby the determined boundaries of the clamps 18, the control unit 12 at step 180 may determine the no-punch zones of the clamps 18. As a result, punching or forming operations may be inhibited at step 190 when the tool and the clamp 18 are positioned such that a no-punch zone of the clamp 18 impinges the tool. In the alternative, the control unit 12 may initiate repositioning of the clamps 18 when one or more of the clamps 18 and its associated no-punch zone such as shown at step 200 are sensed in a position to impinge the tool. Following inhibiting punching or repositioning of the clamp 18, a new tool may be selected for punching or otherwise machining of the workpiece at step 160. The subsequent determinations of the no-punch zones of the clamps 18 are then made based on the new selected tool and the clamp positions.

It should be understood that various changes and modifications to the presently preferred embodiments described herein will be apparent to those skilled in the art. Such changes and modifications can be made without departing from the spirit and scope of the present invention and without diminishing its attendant advantages. It is, therefore, intended that such changes and modifications be covered by the appended claims.

We claim as our invention:

1. A method for identifying no-punch zones corresponding to positions of a plurality of repositionable work clamps on a carriage holding a workpiece to be positioned for a punch press having various interchangeable tools, such as punches and the like, the method comprising the steps of:

(a) storing geometric configuration information relating to each of the plurality of clamps;

(b) storing specifications for each of the plurality of tools wherein the specifications include position and dimension information with respect to the tools;

(c) sensing a portion of one of the plurality of repositionable clamps;

(d) storing coordinates associated with the sensed clamp;

(e) determining boundaries of the clamp based on the sensed portion of the clamp and the stored geometric configuration information of the clamp;

(f) repeating steps (c), (d) and (e) for each of the plurality of repositionable clamps;

(g) determining the no-punch zones of the repositionable clamps based on the stored information of at least one of the tools in relation to the determined boundaries of the clamps; and (h) determining if a clamp movement would place the no-punch zone of the clamp in a position where the clamp may be impinged by one of the plurality of tools.

2. The method of claim 1 further comprising the step of:

inhibiting operation of the punch press when one of the plurality of repositionable clamps is positioned so that its no-punch zones impinge upon the tool.

3. The method of claim 1 further comprising the step of:

repositioning the clamp and its implied no-punch zone to a safe position before a punching operation of the punch press if the answer to (h) is yes.

4. The method of claim 1 further comprising the step of:

establishing position information for use as a default setting.

5. The method of claim 1 further comprising the step of:

activating a flag upon occurrence of an event.

6. The method of claim 5 further comprising the step of:

positioning the clamp in a default position upon activation of the flag.

7. The method of claim 1 further comprising the steps of:

detecting if at least one of the plurality of repositionable clamps and its implied no-punch zone is within or approaching impingement by a tool; and repositioning at least one of the plurality of clamps to a safe position.

8. A system for identifying no-punch zones for a punch press, the system comprising:

a tool holder including a plurality of tools wherein each of the plurality of tools of the tool holder is constructed and arranged for contacting the workpiece;

a carriage;

a plurality of repositionable clamps holding the workpiece and movable along the carriage wherein the clamps each include a vane;

a sensor for determining the positions of at least an edge of each of the plurality of movable clamps; and a control means for storing information with respect to geometric configurations of each of the movable clamps and specifications for each of the tools of the tool holder wherein the control unit determines boundaries of the no-punch zones of the movable clamps from the sensed positions, the stored information and the specifications.

9. The system of claim 8 wherein the control means inhibits operation of the punch press in one of the no-punch zones of the movable clamps.

10. The system of claim 8 wherein the control means initiates repositioning of at least one of the plurality of movable clamps.

11. The system of claim 8 wherein the control means further stores information relating to a default position.

12. The system of claim 11 wherein the control means initiates designation of the default position.

13. The system of claim 8 wherein the tool holder is a turret.

14. A method for controlling operation of a punch press including a plurality of tools for machining a workpiece held by a plurality of repositionable clamps by identifying zones of the repositionable clamps for altering the operation of the press, the method comprising the steps of:

sensing position information of at least a portion of each of the plurality of repositionable clamps prior to holding the workpiece;

providing a signal indicative of the sensed position information;

storing information relating to the plurality of tools, geometric data of the plurality of repositionable clamps, and the sensed position information of the portion of each of the plurality of clamps; and determining the zones of the repositionable clamps for altering the operation of the punch press based on the stored information.

15. The method of claim 14 further comprising the step of:

inhibiting operation of the punch press upon detection of the position of one of the repositionable clamps of the punch press and its associated no-punch zone whereby the clamp may be impinged by a tool.

16. The method of claim 14 further comprising the step of:

repositioning at least one of the plurality of the repositionable clamps of the punch press to a safe position.

17. The method of claim 14 further comprising the step of: storing information relating to a default operation zone.

18. The method of claim 17 further comprising the steps of:

determining conditions of the punch press upon which a flag is activated; and altering operation of the punch press to the default operation zone upon the activation of the flag.

* * * * *